Jan. 12, 1937.    J. W. B. PEARCE    2,067,287
DRIVE SHAFT ARRANGEMENT
Filed June 26, 1935
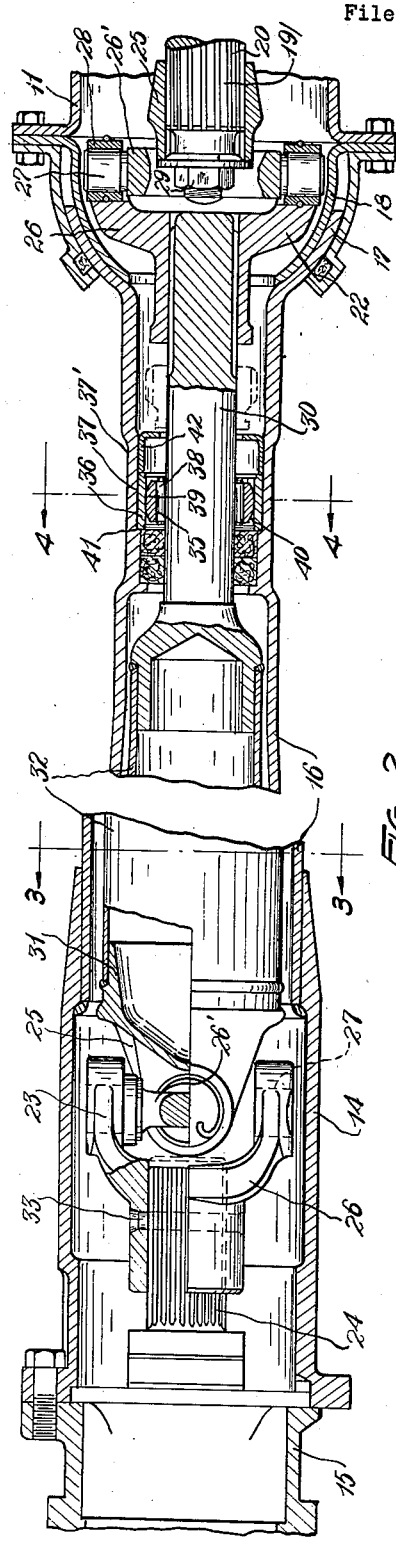
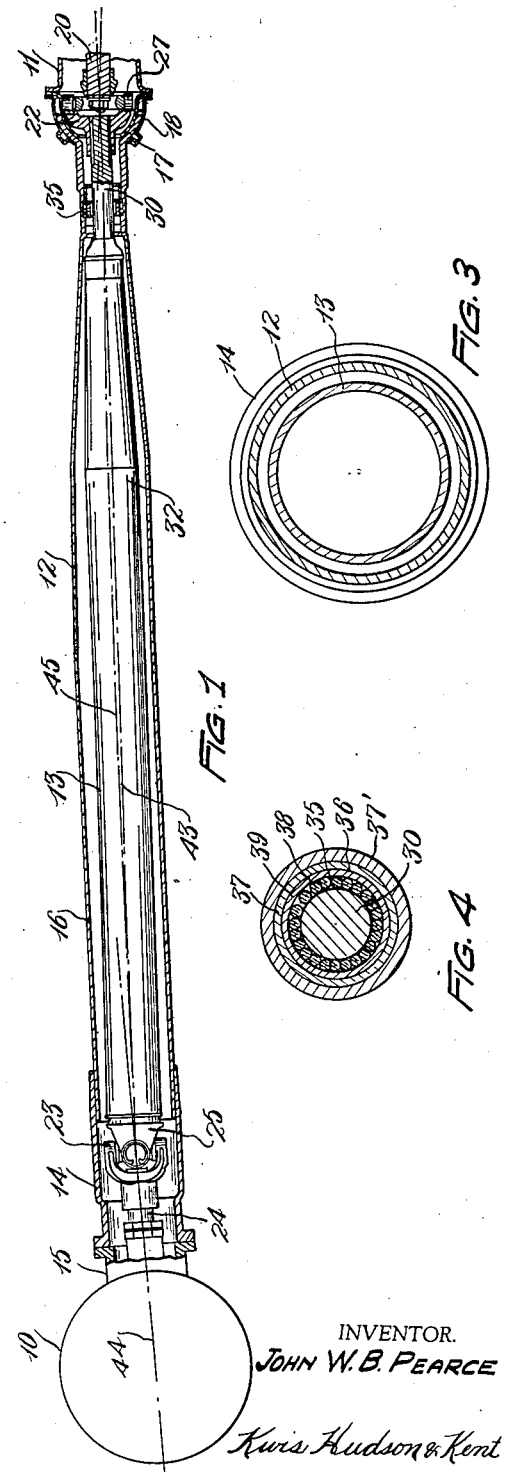
INVENTOR.
JOHN W. B. PEARCE
Kwis Hudson & Kent
ATTORNEYS Patented Jan. 12, 1937

2,067,287

UNITED STATES PATENT OFFICE 2,067,287

DRIVE SHAFT ARRANGEMENT

John W. B. Pearce, Toledo, Ohio

Application June 26, 1935, Serial No. 28,505

7 Claims. (Cl. 180—85)

This invention relates to a drive shaft arrangement for motor vehicles and the like, and more particularly to an improved torque tube and propeller shaft arrangement.

Certain automobile manufacturers have found it desirable to increase the length of the torque tube and propeller shaft over lengths used heretofore, and it is found that torque tubes of such increased length are subject to bending and whipping as the result of driving and braking reactions from the driving axle. Such bending and whipping is undesirable, but is especially detrimental when the deflections are transmitted to the propeller shaft, because rotation of the propeller shaft while in a bowed condition produces harmful vibrations. To overcome this difficulty I have devised the improved torque tube and propeller shaft arrangement to be described hereinafter.

It is, therefore, an object of the present invention to provide an improved torque tube and propeller shaft arrangement, wherein the propeller shaft is so constructed and mounted as to enable the same to accommodate itself to bending deflections of the torque tube.

Another object of the invention is to provide an improved torque tube and propeller shaft arrangement, wherein the propeller shaft is provided with flexible couplings, one of which is adjacent the driving axle and the other of which is located substantially at the pivotal connection for the other end of the torque tube.

Still another object of the invention is to provide an improved torque tube and propeller shaft arrangement, wherein the propeller shaft is provided at its opposite ends with universal joints for connection, respectively, with a driving shaft and a shaft member of the driving axle, and wherein a self-aligning bearing for the propeller shaft is mounted on the torque tube at a point spaced from the universal joint connected with the axle shaft member.

It is also an object of this invention to provide an improved torque tube and propeller shaft combination having increased resistance to bending and whipping, and comprising a tapered torque tube and a tapered propeller shaft extending therein.

Other objects and advantages of the invention will be apparent from the following description, when taken in conjunction with the accompanying sheet of drawings, wherein Fig. 1 is a longitudinal sectional view of a drive shaft arrangement embodying my invention, and showing the torque tube in a bowed condition.

Fig. 2 is a longitudinal sectional view taken through portions of the torque tube and propeller shaft and illustrating the same on a larger scale, and Figs. 3 and 4 are transverse sectional views taken, respectively, on lines 3—3 and 4—4 of Fig. 2.

The drive shaft arrangement of my invention is especially suitable for use on motor vehicles requiring a torque tube and propeller shaft of increased length, because bending and whipping deflections of the tube and shaft are reduced to a minimum, and because bending deflections of the torque tube are prevented from causing the propeller shaft to rotate in an unbalanced condition and with a wobbling or gyratory action which would set up undesirable vibrations. It will be understood, of course, that the invention may be embodied in various drive shaft arrangements which come within the scope of the appended claims.

In Fig. 1 of the drawing I show my improved drive shaft arrangement as extending between a driving axle 10 and the transmission 11 of a motor vehicle. This improved drive shaft arrangement comprises a torque tube 12, and a propeller shaft 13 extending within the torque tube.

The torque tube 12 may be constructed with a sleeve part 14 at one end thereof, which is bolted or otherwise connected to the pinion shaft mount 15 of the driving axle 10. The torque tube may have an outwardly extending tube part 16 of suitable cross-sectional shape, which is welded or otherwise connected to the sleeve part 14. At the other end of the torque tube the tube part 16 may be provided with a ball-like casing part 17 which slidably cooperates with a correspondingly shaped ball-part 18 of the transmission 11 to provide a pivotal connection between the torque tube and the transmission. The cooperating ball-shaped casing parts 17 and 18 also provide a housing into which the splined end 19 of the driving shaft 20 of the transmission 11 extends for connection with the propeller shaft.

The propeller shaft 13 extends within the torque tube 12 and has one end thereof connected to the transmission shaft 20 by means of a flexible coupling, preferably in the form of a universal joint 22, which is disposed within the casing formed by the cooperating ball sections 17 and 18. According to my invention a second universal joint 23 is provided for the other end of the propeller shaft and is located adjacent the driving axle 10. The universal joint 23 connects the propeller shaft with the shaft member 24, which may be a pinion shaft or worm shaft of the driving axle.

The universal joints 22 and 23 may be of any desired construction, one suitable form thereof being shown in the drawing as comprising a pair of yoke members 25 and 26 and a cross 26' having pairs of aligned trunnions 27 extending into aligned bearings 28 of the yoke members. The yoke member 25 of the universal joint 22 may be splined to the transmission shaft 20 and may be retained thereon by the nut 29. The yoke member 26 may have a splined slip connection with the stem part 30 of the propeller shaft 13. The yoke member 25 of the universal joint 23 may have a sleeve part 31 welded or otherwise connected to the tubular part 32 of the propeller shaft. The yoke member 26 of the universal joint 23 may be splined to the shaft member 24 of the driving axle and retained thereon by means of the transverse pin 33.

It may be desirable to provide the propeller shaft with a supporting bearing adjacent the slip connection formed by the cooperating splines of the solid stem part 30 and the yoke 26 of the universal joint 22, and in this instance I show a bearing 35 provided for this purpose. When a bearing is provided for the propeller shaft, for the purpose mentioned, I propose to use a self-aligning bearing. The bearing 35 is a self-aligning bearing, and is constructed with an outer shell 36 which engages in a bearing seat 37 formed in the cylindrical tube part 37' of the torque tube adjacent the ball section 17 thereof. While any suitable type of self-aligning bearing may be used for this purpose, I show the bearing 35 in this instance as having an annular series of anti-friction elements 38 engaging the stem part 30, and an outer race 39 for the anti-friction elements. The outer race 39 may have a spherical outer surface 40 for rocking engagement with the inner surface of the shell 36. The self-aligning bearing 35 may be retained in place longitudinally of the torque tube by means of the internal annular shoulder 41 and the retainer 42 which is pressed into the tube to hold the outer shell 36 of the bearing in engagement with the shoulder.

From the arrangement just explained for the universal joints and the self-aligning bearing 35, it will be seen that when the torque tube is subjected to bending by the braking or driving reactions from the axle 10, there will be a bowing of the torque tube in a vertical plane, either upwardly or downwardly, depending upon the direction of the reaction. In Fig. 1 of the drawing I have illustrated, somewhat diagrammatically, the effect of such an upward bending or deflection of the torque tube. When such deflection occurs, the outer race 39 of the bearing 35 rocks in the outer shell 36 and the axis 43 of the propeller shaft 13 moves out of true alignment with the axis 44 of the shaft member 24 of the axle 10, so that the axis of the shaft member 24 and the axis of the propeller shaft assume an angular relation which is illustrated in an exaggerated condition in Fig. 1. Such angular relation between the shaft member 24 and the propeller shaft is permitted by the yoke members 25 and 26 of the universal joint 23 assuming angularity, the degree of which depends upon the extent of deflection of the torque tube. The bowing of the torque tube causes a change in the relative position of the propeller shaft 13 therein as is indicated by the displacement of the axis 45 of the torque tube relative to the axis 43 of the propeller shaft.

Thus it will be seen that by reason of the rocking of the bearing 35 and the members of the universal joint 23 assuming angularity, the propeller shaft 13 can always rotate upon a fixed straight axis regardless of vertical bending or whipping of the torque tube. To more fully explain the advantage of the present invention, it is pointed out that if the bending of the torque tube is transmitted to the propeller shaft and the latter is rotated in its bowed condition, it must necessarily rotate with a gyratory action or, in other words, in an unbalanced condition. Rotation of the propeller shaft with such a gyratory action would necessarily set up vibrations which would be objectionable from the standpoint of smoothness of operation, wear on moving parts and increased stresses set up in the affected parts.

To minimize the bending of the torque tube and propeller shaft as the result of braking and driving reactions, I may construct the tube part 16 with a taper, as shown in Figs. 1 and 2, and also construct the tube part 32 of the propeller shaft 13 with a corresponding taper. The tapering of these parts increases their rigidity and resistance to the objectionable whipping and bending explained above.

From the foregoing description and the accompanying drawing it will now be readily seen that I have provided an improved torque tube and propeller shaft arrangement, wherein objectionable bending and whipping resulting from driving and braking reactions are reduced to a minimum, and wherein bending of the torque tube is prevented from causing gyration of the propeller shaft which would result in objectionable vibrations.

While I have illustrated and described the improved driving arrangement of my invention in a detailed manner, it will be understood that I do not wish to be limited to the precise construction and arrangements of parts illustrated and described, but regard the invention as including such changes and modifications as do not constitute a departure from the spirit of the invention and the scope of the appended claims.

Having thus described my invention I claim:

1. In combination a torque tube, a propeller shaft extending within said torque tube, flexible couplings at opposite ends of said shaft for connection respectively with shaft members of the transmission and driving axle of a motor vehicle, and a self-aligning bearing mounted on the torque tube and engaging the propeller shaft adjacent one of said flexible couplings, said bearing permitting rocking of said tube relative to said shaft upon bowing of the tube.

2. In a motor vehicle drive the combination of a driving axle, a torque tube connected with said axle, means providing a pivotal connection for the torque tube at a point spaced from the axle, a propeller shaft in said torque tube, flexible couplings at opposite ends of the propeller shaft for connection respectively with driving and driven shaft members, one of said couplings being located substantially at said pivotal connection, and a self-aligning bearing for the propeller shaft located adjacent said one coupling.

3. In a motor vehicle drive the combination of a rear axle, a torque tube having one end connected to said axle, means providing a pivotal connection for the other end of the torque tube, a propeller shaft in said torque tube, universal joints at opposite ends of the propeller shaft for connection respectively with a driving shaft and a shaft member of the rear axle, one of said joints being substantially concentric with said pivotal connection and the other being adjacent the rear axle, and a self-aligning bearing for the propeller shaft mounted on the torque tube adjacent said pivotal connection.

4. In a motor vehicle drive the combination of a driving axle having a shaft member, a transmission shaft, a torque tube connected with said axle, a propeller shaft in said torque tube, a universal joint connecting one end of said propeller shaft with the shaft member of the axle, a universal joint connecting said transmission shaft with the other end of the propeller shaft and having a slip connection with one of said shafts, and a self-aligning bearing having supporting engagement with the propeller shaft adjacent the second mentioned universal joint.

5. In a motor vehicle drive the combination of a driving axle having a shaft member, a transmission shaft, a torque tube connected with said axle, means providing a pivotal connection for the torque tube at a point spaced from the axle, a propeller shaft in said torque tube, a universal joint connecting one end of the propeller shaft with the shaft member of the axle, a universal joint connected with the transmission shaft and disposed substantially concentrically with said pivotal connection, means providing a slip connection between said universal joint and the other end of the propeller shaft, and a self-aligning bearing on the torque tube having supporting engagement with the propeller shaft adjacent said slip connection.

6. In a motor vehicle drive the combination of a driving axle, a tapered torque tube having one end connected with said axle, means providing a pivotal connection for the other end of the tube, a tapered propeller shaft extending within the tube and having universal joints for connection respectively with a driving shaft and with a shaft member of the axle, one of said joints being substantially concentric with said pivotal connection, and a self-aligning bearing for the propeller shaft mounted on the torque tube adjacent said pivotal connection.

7. In combination a torque tube having a tapering tube part and a substantially cylindrical tube part connected therewith, and a propeller shaft extending within the tapered torque tube and comprising a tapered tubular shaft part disposed in the tapered part of the torque tube and a solid shaft part connected with the tapered shaft part and disposed in said cylindrical part.

JOHN W. B. PEARCE.